United States Patent

[11] 3,615,968

[72] Inventors Raymond John Ceresa;
Kenneth Martin Sinnott, both of London, England
[21] Appl. No. 685,476
[22] Filed Nov. 24, 1967
[45] Patented Oct. 26, 1971
[73] Assignee W. R. Grace & Co.
New York, N.Y.

[54] METAL-METAL BONDING
4 Claims, 4 Drawing Figs.

[52] U.S. Cl. ................................................. 156/73,
29/470.3, 113/116 W, 113/120 K
[51] Int. Cl. .................................................. B32b 1/08
[50] Field of Search .......................................... 156/73;
29/470.3, 323; 113/116 W, 120 F, 120 K

[56] References Cited
UNITED STATES PATENTS
| | | | |
|---|---|---|---|
| 3,284,257 | 11/1966 | Soloff et al. | 156/73 |
| 2,946,119 | 7/1960 | Jones | 29/470 |
| 2,985,954 | 5/1961 | Jones | 29/470 |
| 3,184,354 | 5/1965 | Strother | 156/73 |
| 3,193,169 | 7/1965 | Arnold | 156/73 X |
| 3,193,424 | 7/1965 | Scott | 156/73 |

FOREIGN PATENTS
| | | | |
|---|---|---|---|
| 33-9142 | 1959 | Japan | 156/73 |
| 660,845 | 1963 | Canada | 156/73 |

OTHER REFERENCES
Ultrasonic Assembly– Bulletin S–888, Brunson Sonic Power Co.

*Primary Examiner*—Carl D. Quarforth
*Assistant Examiner*—Brooks H. Hunt
*Attorneys*—C. Edward Parker and Metro Kalimon ABSTRACT: Metal to metal bonding using a heat-sensitive adhesive is effected by application of ultrasonic energy to a metal-adhesive-metal assembly. The metals bonded may be, for example, sheets, strips, or the ends of a can blank, thus producing a side-seam.

METAL-METAL BONDING

This invention relates to metal-metal bonding using a heat-activatable adhesive.

In one aspect, the invention provides a method of bonding metal to metal with a heat-activatable adhesive, which comprises forming an assembly of two pieces of metal to be bonded, and between them, in contact with each, a layer of a heat-activatable adhesive for the metal or metals, and activating the adhesive by means of ultrasonic energy, while holding the assembly under pressure.

The invention is particularly applicable to the formation of seams, e.g. side-seams, for cans. In this application, the two pieces of metal to be bonded are the two ends of a can blank, and the assembly is formed so as to bond together the overlapping ends, thus completing the can cylinder and forming a side-seam. It will be understood therefore that the term "pieces of metal" may be construed in the sense of two separate pieces of metal or as two separate portions of one metal body.

In one method of practicing the method of the invention, the ultrasonic energy is transmitted through a plunger, made of solid metal or other material capable of transmitting ultrasonic vibrations and resistant to high temperatures, while the assembly of metals and the adhesive is maintained under pressure between the plunger and a support. The plunger face will be shaped as desired according to the shape of the metal to be bonded. In forming seams for cans the operating surface of the plunger, i.e. the surface which makes contact with the assembly, will preferably be rectangular.

The support member may take any appropriate shape. It may be a simple platform. Preferably it will have a clamp or other means of securing the assembly of metals and adhesive to the support. The support bay be fixed and the plunger movable, or the plunger fixed and the support movable. Preferably the support is fixed, especially when the method is applied to the formation of seams for cans.

Members which are capable of transmitting ultrasonic energy are known in themselves, and normally comprise a so-called "horn" of titanium or other metal which is fastened at is broader end to a transducer element in such a way that a node occurs at the point of junction between the horn and the transducer element, and an antinode at the tip or operating surface of the horn. The precise shape of the horn and its length and general cross section will, of course, depend primarily on the ultrasonic frequency which is to be employed, and can easily be determined by trail and error for any given frequency once the size and shape of the operating surface have been chosen with regard to the particular operation to be performed. Alternatively the frequency can be chosen to suit a particular length and general cross section. Normally the frequency will be between 15 and 50 kc./s., preferably 18–20 kc./s. Frequencies much lower than 18 kc./s. will not usually be used, so as to avoid discomfort to the operator. Other materials of construction which may be employed instead of titanium include for example Duralumin, tool steel and phosphor bronze. Titanium is preferred however as giving the longest life.

The particular type of generator of ultrasonic energy employed is not important. Usually it will probable be found most convenient to use a magnetostrictive device, but other devices for generating high-frequency vibrations such, for example, as piezo-electric devices can be employed.

It may be desirable to provide means for cooling the transducer element and/or the plunger during operation. This may be done for example by surrounding the transducer element with a water-bath or similar cooling means, and by including cooling water channels within the body of the plunger.

In a preferred method of carrying out the invention, there are interposed, between the plunger head and the uppermost metal piece and between the lowermost metal piece and the support respectively, cushion members which transmit ultrasonic energy and are not good conductors of heat. The cushion members may be, for example, thin metal bridges the feet of one of which make contact with the plunger face, and the feet of the other with the support, i.e. one bridge is upturned with respect to the other. The bridges are preferably thin, subject to their being strong enough to withstand the pressure generated between the support and the plunger head. If they are too thick, the heating time will be unnecessarily long as the bridges will be better conductors of heat. Even better cushion members are provided by sheets of material which are less good heat conductors, especially good thermally insulating materials such as polytetrafluoroethylene sheets. Such sheets may suitably be 0.13–0.25 mm. thick, and being nonconductors, are not provided with feet or other projections.

The adhesive will usually be one of the many known organic heat-activatable adhesives, particularly a straight or branched chain polyamide, e.g. Nylon 11 or 12, or an ethylene/acrylic acid copolymer. They may contain one or more curing accelerators, e.g. p-quinone dioxime dibenzoate.

In another aspect the invention comprises apparatus for carrying out the above-described method, comprising a support for the assembly, an ultrasonic generator, a member capable of transmitting ultrasonic energy from the generator to the assembly on the support, and means whereby an assembly on the support can be pressed between the support and the transmitting member, held under pressure therebetween for a predetermined time, and then released. Suitable apparatus is illustrated semidiagrammatically in the accompanying drawing, in which.

Figure 1:
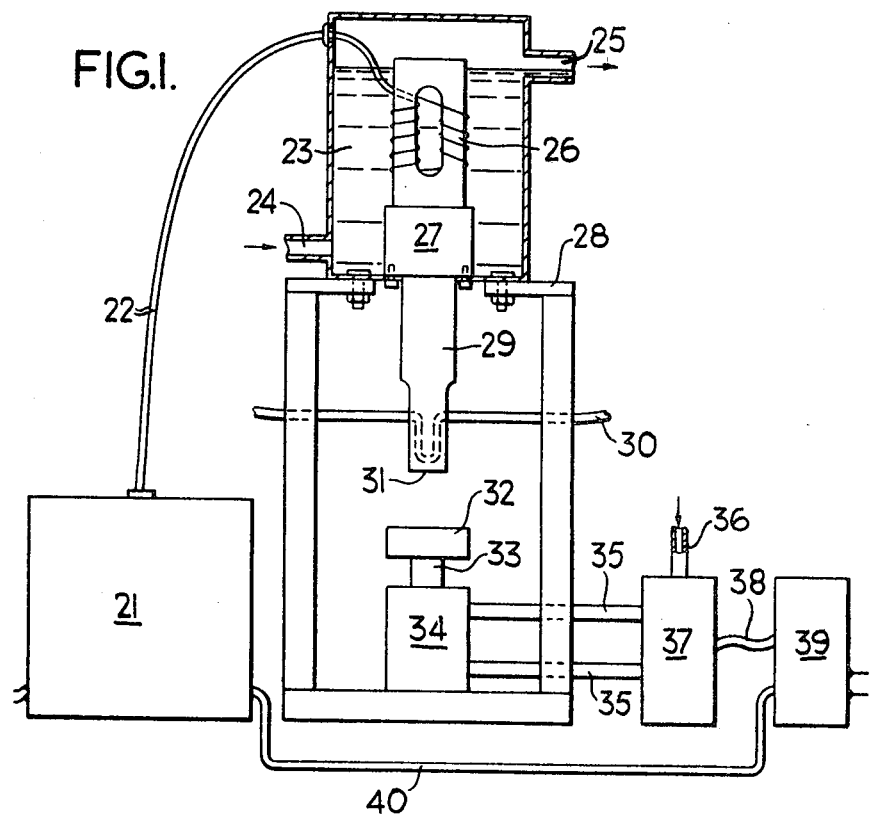
FIG. 1 is a diagrammatic front elevation, partly in section.

Referring first to FIG. 1, the apparatus comprises a transducer 26 electrically connected through wires 22, to a generator 21 and surrounded by a water-cooled jacket 23 having an inlet 24 and outlet 25. The water-cooled jacket 23 is bolted to a mounting plate 28. A velocity transformer 27 is secured to the bottom of the jacket 23 to lie within the jacket under the transducer 26. The ultrasonic probe 29 is fixed to the bottom of the velocity transformer 27. The probe comprises a solid plunger 31 which can be dismantled from the remainder of the probe. Various types of plunger may be employed, and are preferably so mounted that they can be quickly interchanged. The plunger 31 may, if desired, be provided with a water-cooling system 30.

Where, as in the apparatus shown in FIG. 1, the probe is fixed, the apparatus comprises means for moving the whole piece to be jointed into and out of contact with the plunger 31. The workpiece (not shown) is mounted on a platform 32 which is attached to a column 33, which is movable vertically into and out of a chamber 34 by any conventional means, e.g. hydraulically, mechanically or electrically. The means shown diagrammatically in FIG. 1 comprises a double-action cylinder 34, a pair of pipes 35 for supplying compressed air to, and for exhausting air from, cylinder 34, a solenoid-actuated valve 37 for controlling the flow of compressed air, along pipes 35 from a source of compressed air (not shown), and a pipe 36 connecting said source to the valve 37.

A timing device represented diagrammatically by 39 is connected to valve 37 by wires 38. It can also be connected to generator 21 by further wires 40.

Figure 4:
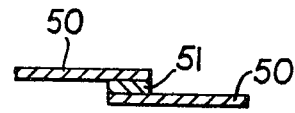
FIG. 4 shows in section an assembly of two strips of metal and an intermediate adhesive layer.

Referring now to FIG. 4, in one method of operation, a metal-adhesive-metal assembly comprising two metal sheets 50 and an intermediate adhesive layer 51 is mounted on platform 32. Polytetrafluoroethylene sheets 0.15 mm. thick (not shown) are placed between the platform and the lowermost metal sheet and between the plunger and the uppermost metal sheet. Compressed air is fed through valve 37 into the lower pipe 35 and column 33 and platform 32, bringing the assembly into contact with the face of plunger 31. Meanwhile, the timing device 39 which actuates valve 37 trips a switch to start generator 21 and hence produces ultrasonic energy by means of transducer 26. Alternatively the generator can run continuously or activated by movement of the platform. The ultrasonic energy so created is transmitted through the velocity transformer 27 and the solid plunger 31 to heat the adhesive. After a predetermined time interval, valve 37 is actuated to release compressed air from cylinder 34 and thereby lower platform 32 to release the bonded assembly from contact with the plunger, and at the same time the current to the generator 21 is switched off.

Figure 2:
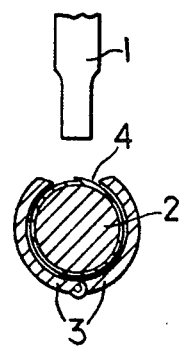
FIG. 2 and 3 are cross-sectional and side elevational views of means for supporting a can-blank.
Figure 3:
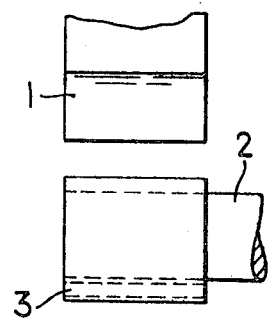

Referring to FIGS. 2 and 3, in another method of operation of the invention, the support member 32 of FIG. 1 is replaced by a cylindrical metal mandrel 2, which, if desired, may be coated with polytetrafluoroethylene or other thermal insulating material. A can blank 4 is supported on the mandrel and held in place by removable arcuate ring member 3. The plunger 1 is lowered and impressed on the metal at the point of overlap to form a can side-seam.

It is a particular advantage of the invention that the apparatus is extremely compact, and only the actual areas to be bonded need be heated.

The operation of the method may be continuous. For example, side-seams for cans may be formed by moving a long cylindrical mandrel supporting can blanks beneath a transmitting member and stamping the member down onto the can blank at regular intervals. The transmitting member may contact the whole of the seam simultaneously, or may be caused to travel along the seam. The potential adhesive may be placed on the cans in the form of a tape or ribbon, and may be extruded directly onto them upstream of the ultrasonic heating apparatus.

The following examples illustrate the invention.

EXAMPLES 1-4

The following general method was employed in example 1. A strip of heat-sensitive adhesive 1 cm. by 1 cm., 0.13-0.25 mm. thick, was placed on one end of a piece of metal 1 cm. wide and 0.15 mm. thick. A precisely similar strip of metal was placed over the original strip so that the amount of overlap of the two pieces of metal was 1 cm., and the adhesive lay between the two metal strips at the region of overlap.

A metal bridge 0.22 mm. thick was placed on the platform of an apparatus as described in FIG. 1 of the drawing, except that the probe head was not provided with a liquid cooling passage. The metal-adhesive-metal assembly was placed on top of the bridge. Between the uppermost sheet of metal, and the probe was placed an upturned metal bridge. The assembly on the platform of the bridge-metal-adhesive-metal upturned-bridge was brought up to a stationary probe by an upward force of 110 kg. on the platform, and ultrasonic energy was generated and transmitted through the probe. The ultrasonic energy generator was switched off after a time shown below and the platform returned to its original position. The metals were bonded by the adhesive, which was now 0.075-0.13 mm. thick. The lap-strength of the bond was tested in a tensile tester.

The same method was used in examples 2 and 3 with the modification that each metal bridge was replaced by a 0.15 mm. thick sheet of polytetrafluoroethylene.

Details of examples 1-3 are shown in table 1.

TABLE I

| Example | Metal bond d | Adhesive | Time of heating by ultrasonic energy (seconds) | Lap shear strength (kg./cm.²) |
|---|---|---|---|---|
| 1 | Weirchrome¹ | QX 3623.15³ | 30 | >77 |
| 2 | Lacquered² chemically-treated steel. | Nylon 11 | 30 | >77 |
| 3 | Weirchrome | Composition containing QX 3623.15⁴. | 20 | >77 |

Key:
1. A mild steel, highly oriented, and treated to produce a chromium-containing coating (for corrosion resistance). Made by National Steel Co. U.S.A.
2. Strips from a steel sheet chemically treated to give a chromium oxide coating, coated with an epoxy-phenolic lacquer (as adhesion-promoting primer). Made by U.S. Steel.
3. A Dow experimental polymer "Zetafin QX 3623.15" which is a copolymer or ethylene with acrylic or methacrylic acid.
4. A composition comprising 100 parts by weight of QX 3623.15, 3 parts by weight of p-quinone dioxime dibenzoate, (as a cross-linking agent, which also increases the viscosity of the composition and the strength of the bonded product) and 45 parts by weight of titanium dioxide (as a whitening agent).

The precise lap shear strengths could not be determined as the metal broke before the joint.

EXAMPLES 4-7

The method of examples 2 and 3 was repeated except that the overlap between the metal strips was reduced to one half cm.

Table 11 shows the operating details and the results obtained.

TABLE II

| Example: | Metals bonded | Adhesive | Time of heating by ultrasonic energy (sections) | Lap shear strength (kg./cm.²) |
|---|---|---|---|---|
| 4 | As Example 2 | Nylon 11 | 5 | 49 |
|   |   |   | 10 | >168ª |
| 5 | As Example 3 | As Example 3 | 3 | 63 |
|   |   |   | 4 | 102 |
|   |   |   | 5 | 130 |
|   |   |   | 10 | 108 |
| 6 | Weirchrome | OX 3623.15 | 5 | 85 |
|   |   |   | 10 | 145 |
| 7 | Tin plated steel | Versalon⁵ 1140 | 5 | 54 |

ª Metal broke.

Key:
5. A high molecular weight solid polyamide made by General Mills.

Examples 4-7 illustrate the dependence of bond strength on the time of heating. The optimum time for a particular metal-adhesive-metal combination can easily be determined by simple tests. The bond strengths obtained are very high, having regard to the particular metal-adhesive-metal combinations. Even the result in example 7 is very satisfactory as "Versalon 1140" is not a high-strength adhesive. Peel strengths were measured by bonding completely overlapped metal strips according to the methods of example 6 with a 10 second heating time, and example 7 with a 5 seconds heating time. The peel strengths were (respectively) 4.5 and 2.7 kg./cm.

The side-seams of metal cans can be formed using the above techniques and the apparatus of FIG. 1-3 of the drawings.

We claim:

1. method of forming a metallic can cylinder which comprises applying an heat activatable adhesive to at least one end of a metallic can blank, overlapping the opposed ends of the blank to define a cylinder, and applying pressure and ultrasonic energy in the frequency range between about 15 and 50 kc./s. to the overlapped ends for a time sufficient to bond the ends and thereby from a side seam having an adhesive film thickness in the range of about 0.075-0.63 mm.

2. A method according to claim 1 wherein the adhesive is applied in the form of a tape.

3. A method according to claim 1 wherein the adhesive is extruded directly onto one of the ends.

4. A method according to claim 1 wherein the blank is formed of tin-plated steel and the adhesive is a polyamide.

* * * * *